(12) United States Patent
Venton-Walters et al.

(10) Patent No.: US 8,991,834 B2
(45) Date of Patent: *Mar. 31, 2015

(54) GAS SPRING ASSEMBLY FOR A VEHICLE SUSPENSION SYSTEM

(71) Applicant: Oshkosh Corporation, Oshkosh, WI (US)

(72) Inventors: Roy Venton-Walters, Neshkoro, WI (US); Aaron J. Rositch, Oshkosh, WI (US); Jesse L. Knoble, Oshkosh, WI (US); Erik S. Ellifson, Oshkosh, WI (US); Mark L. Steckling, Neenah, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,812

(22) Filed: Jun. 16, 2014

(65) Prior Publication Data
US 2014/0291945 A1   Oct. 2, 2014

Related U.S. Application Data

(63) Continuation of application No. 13/908,785, filed on Jun. 3, 2013, now Pat. No. 8,764,029, which is a continuation of application No. 12/872,782, filed on Aug. 31, 2010, now Pat. No. 8,465,025.

(51) Int. Cl.
*B60G 17/00* (2006.01)
*B60F 1/00* (2006.01)
(Continued)

(52) U.S. Cl.
CPC .............. *B60G 15/12* (2013.01); *B60G 11/27* (2013.01); *B60G 11/30* (2013.01); *B60G 17/04* (2013.01);
(Continued)

(58) Field of Classification Search
USPC .............. 280/6.15, 6.157, 124.157, 124.158, 280/124.16
See application file for complete search history.

(56) References Cited

U.S. PATENT DOCUMENTS

| 3,941,403 A | 3/1976 | Hiruma |
| 4,616,810 A * | 10/1986 | Richardson et al. .......... 267/218 |

(Continued)

FOREIGN PATENT DOCUMENTS

| EP | 1 219 856 A1 | 7/2002 |
| EP | 1 598 124 A1 | 11/2005 |

(Continued)

OTHER PUBLICATIONS

U.S. Appl. No. 13/792,151, filed Mar. 10, 2013, Oshkosh Corporation.

(Continued)

*Primary Examiner* — Toan To
(74) *Attorney, Agent, or Firm* — Foley & Lardner LLP

(57) ABSTRACT

A gas spring for a vehicle suspension system includes a cylinder, a rod disposed within the cylinder, a relative movement between the rod and the cylinder changing the volume of a chamber formed between the rod and the cylinder, and an accumulator in communication with the chamber. Compression of gas in the chamber at least partially provides a first spring rate for deflections of the gas spring below a threshold, compression of gas in the chamber at least partially provides a second spring rate for deflections of the gas spring above the threshold, and the first spring rate is greater than the second spring rate.

20 Claims, 8 Drawing Sheets

(51) Int. Cl.
  *B60G 15/12* (2006.01)
  *B60G 11/27* (2006.01)
  *B60G 11/30* (2006.01)
  *B60G 17/04* (2006.01)
  *F16F 9/096* (2006.01)
  *B60G 17/052* (2006.01)

(52) U.S. Cl.
  CPC .............. *F16F 9/096* (2013.01); *B60G 17/052* (2013.01); *B60G 17/00* (2013.01); *B60G 2202/152* (2013.01); *B60G 2202/32* (2013.01); *B60G 2500/30* (2013.01)
  USPC .......... 280/6.157; 280/124.157; 280/124.158; 280/124.16

(56) References Cited

U.S. PATENT DOCUMENTS

| | | | |
|---|---|---|---|
| 4,743,000 | A | 5/1988 | Karnopp |
| 4,958,850 | A | 9/1990 | Buma et al. |
| 5,071,158 | A | 12/1991 | Yonekawa et al. |
| 5,400,880 | A | 3/1995 | Ryan |
| 5,957,252 | A | 9/1999 | Berthold |
| 6,086,060 | A | 7/2000 | Berthold |
| 6,161,845 | A | 12/2000 | Shono et al. |
| 6,254,067 | B1 * | 7/2001 | Yih ........................... 267/64.22 |
| 6,305,512 | B1 | 10/2001 | Heinz et al. |
| 6,446,944 | B1 | 9/2002 | Ward |
| 6,516,914 | B1 | 2/2003 | Andersen et al. |
| 6,561,718 | B1 | 5/2003 | Archer et al. |
| 6,575,484 | B2 | 6/2003 | Rogala et al. |
| 6,622,397 | B1 | 9/2003 | Knoble |
| 6,764,085 | B1 | 7/2004 | Anderson |
| 6,880,684 | B1 | 4/2005 | Evans et al. |
| 6,883,815 | B2 | 4/2005 | Archer |
| 6,918,481 | B2 | 7/2005 | Quigley et al. |
| 6,918,721 | B2 | 7/2005 | Venton-Walters et al. |
| 6,938,749 | B1 | 9/2005 | Quigley et al. |
| 6,974,003 | B1 | 12/2005 | Acker et al. |
| 6,976,688 | B2 | 12/2005 | Archer et al. |
| 7,108,253 | B2 | 9/2006 | Venton-Walters et al. |
| 7,124,865 | B2 * | 10/2006 | Turner et al. ................ 188/322.2 |
| 7,207,582 | B2 | 4/2007 | Siebers et al. |
| D572,642 | S | 7/2008 | Steckling et al. |
| 7,472,914 | B2 | 1/2009 | Anderson et al. |
| 7,497,308 | B2 | 3/2009 | McAndrews |
| 7,621,580 | B2 | 11/2009 | Randjelovic et al. |
| 7,963,204 | B2 | 6/2011 | Venton-Walters et al. |
| 8,333,390 | B2 | 12/2012 | Linsmeier et al. |
| 8,376,077 | B2 | 2/2013 | Venton-Walters |
| 8,465,025 | B2 * | 6/2013 | Venton-Walters et al. 280/6.157 |
| 8,596,648 | B2 | 12/2013 | Venton-Walters et al. |
| 8,764,029 | B2 * | 7/2014 | Venton-Walters et al. 280/6.157 |
| 8,801,017 | B2 | 8/2014 | Ellifson et al. |
| 8,801,318 | B2 | 8/2014 | Knoble et al. |
| 8,821,130 | B2 | 9/2014 | Venton-Walters et al. |
| 2005/0001401 | A1 | 1/2005 | Heyring et al. |
| 2005/0062249 | A1 | 3/2005 | Lemmens et al. |
| 2006/0055129 | A1 | 3/2006 | Amano |
| 2006/0192361 | A1 * | 8/2006 | Anderson et al. ...... 280/124.158 |
| 2009/0174158 | A1 | 7/2009 | Anderson et al. |
| 2009/0294231 | A1 * | 12/2009 | Carlson et al. ............. 188/267.2 |
| 2011/0042869 | A1 * | 2/2011 | Runkel ....................... 267/64.28 |
| 2012/0234638 | A1 | 9/2012 | Ellifson et al. |
| 2013/0249175 | A1 | 9/2013 | Ellifson |
| 2014/0131969 | A1 | 5/2014 | Rowe et al. |

FOREIGN PATENT DOCUMENTS

| | | |
|---|---|---|
| WO | WO-90/14528 | 11/1990 |
| WO | WO-91/05180 | 4/1991 |

OTHER PUBLICATIONS

U.S. Appl. No. 13/794,381, filed Mar. 11, 2013, Oshkosh Corporation.
U.S. Appl. No. 13/830,808, filed Mar. 14, 2013, Oshkosh Corporation.
U.S. Appl. No. 13/841,686, filed Mar. 15, 2013, Oshkosh Corporation.
U.S. Appl. No. 14/334,305, filed Jul. 17, 2014, Oshkosh Corporation.
U.S. Appl. No. 14/341,489, filed Jul. 25, 2014, Oshkosh Corporation.
U.S. Appl. No. 29/249,496, filed Oct. 9, 2006, Oshkosh Corporation.
U.S. Appl. No. 29/249,497, filed Oct. 9, 2006, Oshkosh Corporation.
International Search Report for International Application No. PCT/US2011/049642, mail date Jun. 8, 2012, 6 pages.
Invitation to Pay Additional Fees and Partial Search Report received regarding International Application No. PCT/US2011/049642, mail date Feb. 7, 2012, 4 pages.
Written Opinion regarding International Application No. PCT/US2011/049642, mail date Jun. 8, 2012, 9 pages.

* cited by examiner

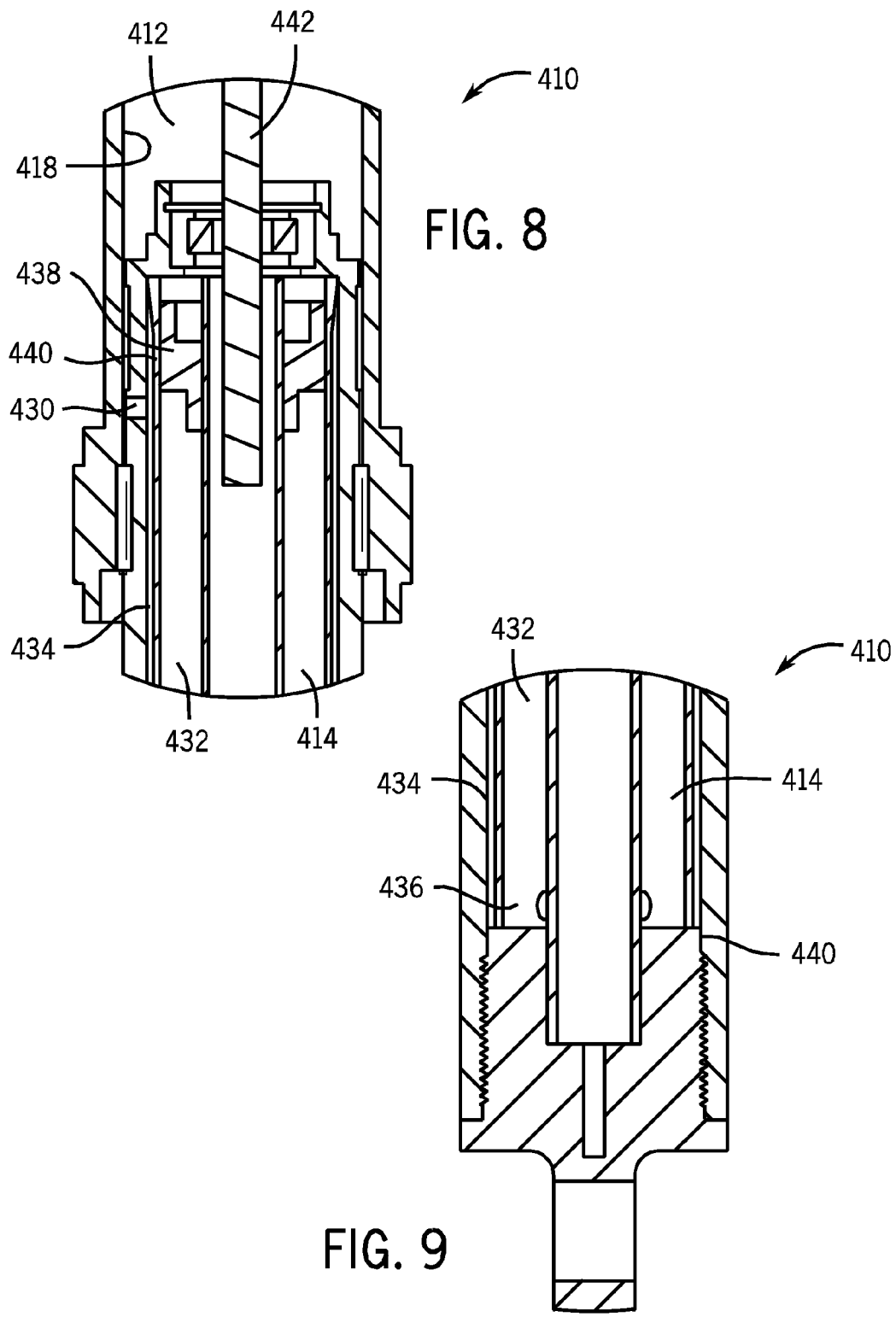

US 8,991,834 B2

GAS SPRING ASSEMBLY FOR A VEHICLE SUSPENSION SYSTEM

CROSS-REFERENCE TO RELATED APPLICATIONS

This is a continuation of application Ser. No. 13/908,785, filed Jun. 3, 2013, which is a continuation of application Ser. No. 12/872,782, filed Aug. 31, 2010, now U.S. Pat. No. 8,465,025, which are incorporated herein by reference in their entireties.

BACKGROUND

The present application relates to suspension systems for vehicles. More specifically, the present application relates to a gas spring for a suspension system.

SUMMARY

One embodiment of the invention relates to a gas spring for a vehicle suspension system that includes a cylinder, a rod disposed within the cylinder, a relative movement between the rod and the cylinder changing the volume of a chamber formed between the rod and the cylinder, and an accumulator in communication with the chamber. Compression of gas in the chamber at least partially provides a first spring rate for deflections of the gas spring below a threshold, compression of gas in the chamber at least partially provides a second spring rate for deflections of the gas spring above the threshold, and the first spring rate is greater than the second spring rate.

Another embodiment of the invention relates to a gas spring for a vehicle suspension system that includes a cylinder, a rod disposed within the cylinder, a relative movement between the rod and the cylinder changing the volume of a chamber formed by the rod and the cylinder, an accumulator in communication with the chamber, and a sensor. The sensor is coupled to at least one of the rod and the cylinder, and the sensor is configured to provide a signal indicative of a ride height of the vehicle suspension system based upon the relative position of the rod and the cylinder.

Yet another embodiment of the invention relates to a gas spring for a vehicle suspension system that includes a cylinder, a rod disposed within the cylinder, a relative movement between the rod and the cylinder changing the volume of a chamber formed by the rod and the cylinder, and a sensor. The sensor is disposed within at least one of the cylinder and the rod, and the sensor is configured to provide a signal indicative of a ride height of the vehicle suspension system based upon the relative position of the rod and the cylinder.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which:

FIG. 8 is a detail view of a portion of the gas spring assembly of FIG. 7, taken along line 8-8 of FIG. 7.

FIG. 9 is a detail view of a portion of the gas spring assembly of FIG. 7, taken along line 9-9 of FIG. 7.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
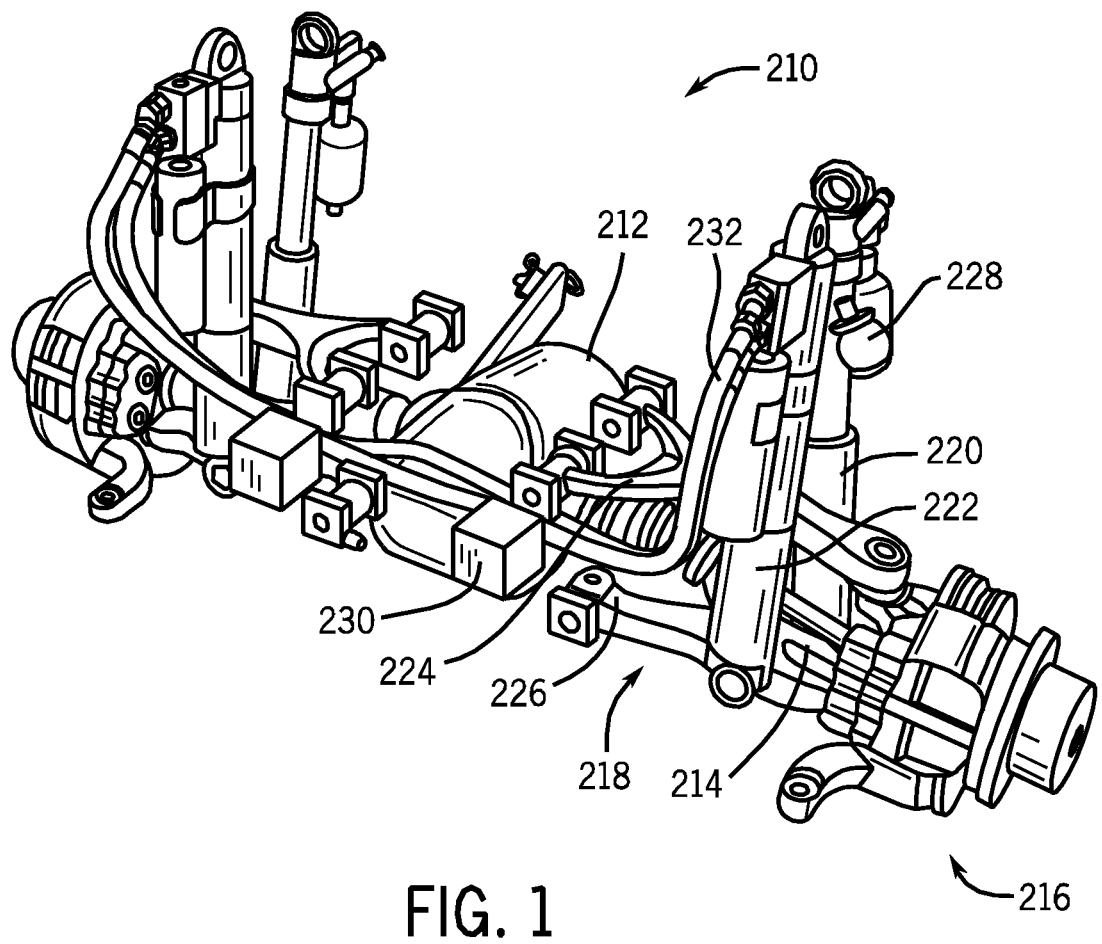
FIG. 1 is a perspective view of an axle assembly, according to an exemplary embodiment of the invention.

According to an embodiment, a vehicle may include a body supported by a suspension system (see, e.g., suspension system 218 as shown in FIG. 1). In some embodiments, the vehicle may be a military vehicle. In other embodiments, the vehicle may be a utility vehicle, such as a fire truck, a tractor, construction equipment, or a sport utility vehicle. The vehicle may be configured for operation on both paved and rough, off-road terrain. As such, the suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

Referring to FIG. 1, an axle assembly 210 is configured for use with the vehicle. According to an exemplary embodiment, the axle assembly 210 includes a differential 212 connected to half shafts 214, which are each connected to a wheel end assembly 216. The wheel end assembly 216 is at least partially controlled (e.g., supported) by a suspension system 218, which includes a spring 220, a damper 222, an upper support arm 224, and a lower support arm 226 coupling the wheel end assembly 216 to the vehicle body or part thereof (e.g., chassis, side plate, hull).

According to an exemplary embodiment, the differential 212 is configured to be connected with a drive shaft of the vehicle, receiving rotational energy from a prime mover of the vehicle, such as a diesel engine. The differential 212 allocates torque provided by the prime mover between half shafts 214 of the axle assembly 210. The half shafts 214 deliver the rotational energy to the wheel-end assemblies 216 of the axle assembly 210. The wheel end assemblies 216 may include brakes, gear reductions, steering components, wheel hubs, wheels, and other features. As the vehicle travels over uneven terrain, the upper and lower support arms 224, 226 at least partially guide the movement of each wheel end assembly 216, and a stopper 228 provides an upper bound to movement of the wheel end assembly 216.

Figure 2:
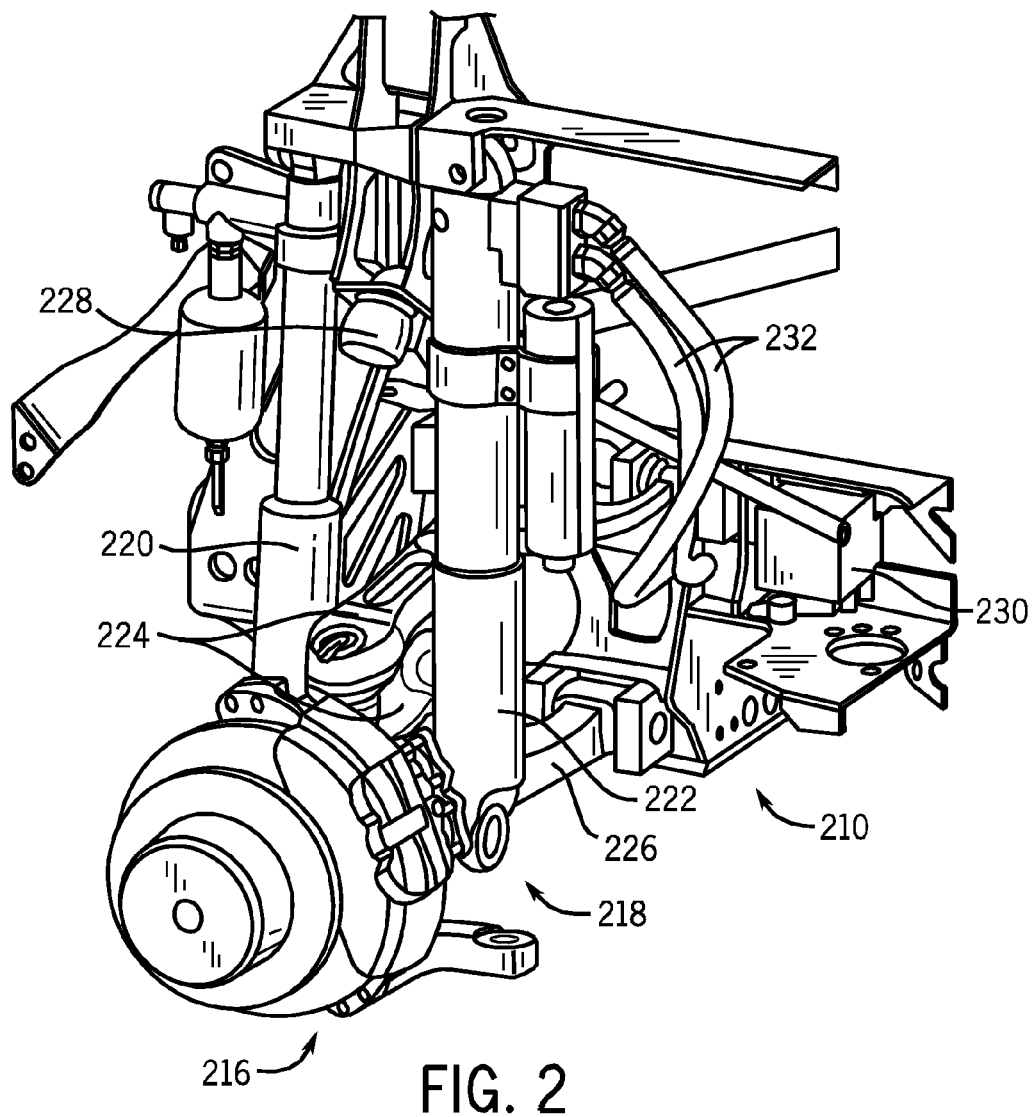
FIG. 2 is a perspective view of a suspension system, according to an exemplary embodiment of the invention.

Referring to FIG. 2, according to an exemplary embodiment the suspension system 218 includes one or more high-pressure gas components, where the spring 220 is a high-pressure gas spring 220. In some embodiments, the suspension system further includes at least one high-pressure gas pump 230. In some such embodiments, the suspension system 218 includes separate high-pressure gas pumps 230 associated with each spring 220 and damper 222 set. In preferred embodiments, the gas of the pump 230, spring 220, and damper 222 includes (e.g., is at least 90%, at least 95%) an inert gas such as nitrogen, argon, helium, etc., which may be stored, provided, or received in one or more reservoirs (e.g., central reservoir, tank) (not shown).

During operation, the pump 230 selectively provides gas, under pressure, to the high-pressure gas spring 220 and/or to reservoirs, tanks, accumulators, or other devices. In some contemplated embodiments, two or more high-pressure gas dampers 222 of the vehicle are cross-plumbed via lines 232 (e.g., hydraulic lines) connecting dampers 222 on opposite sides of the axle assembly 210, between dampers 222 in a "walking beam" configuration for a tandem axle, or between dampers 222 on separate axle assemblies of the vehicle (e.g., between dampers located front-to-back, or diagonally located with respect to each other).

Figure 3:
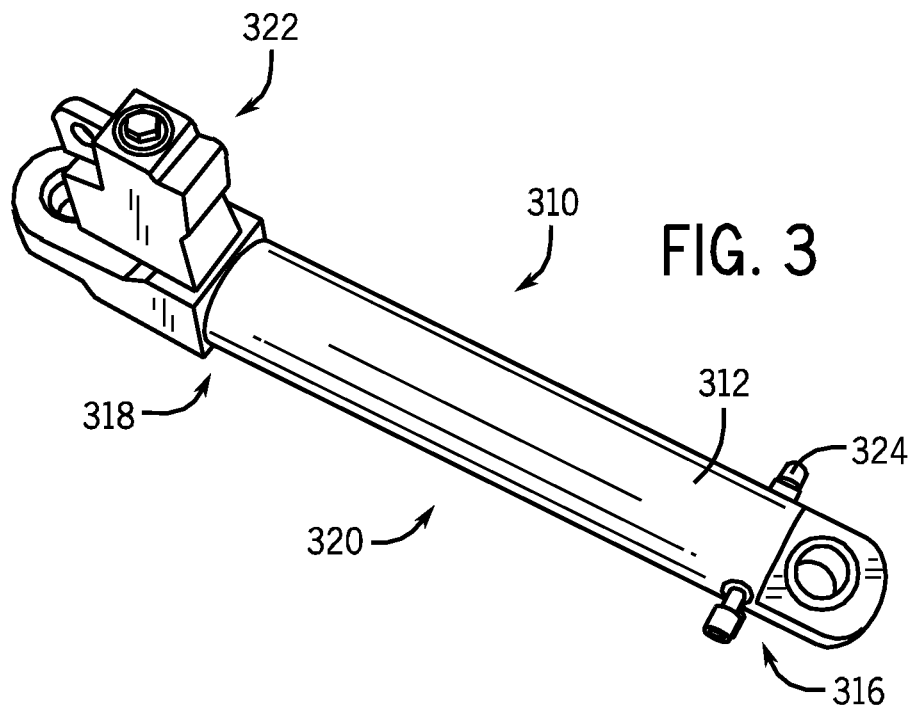
FIG. 3 is a perspective view of a gas spring in a first configuration, according to an exemplary embodiment.
Figure 4:
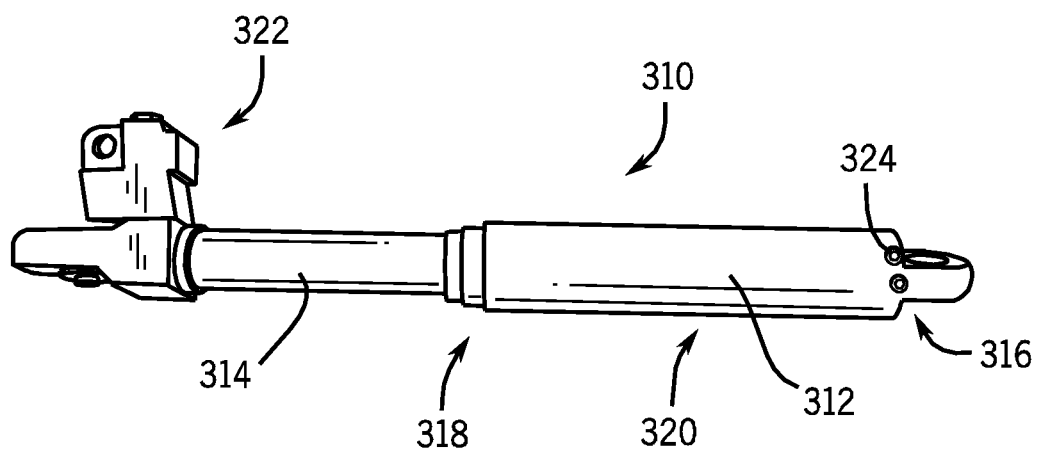
FIG. 4 is a side view of the gas spring of FIG. 3 in a second configuration.
Figure 7:
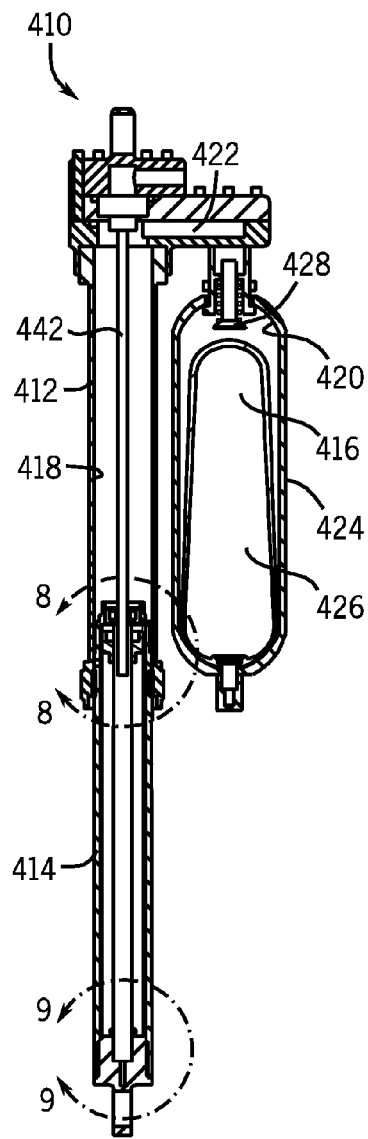
FIG. 7 is a sectional view of the gas spring assembly of FIG. 6, taken along line 7-7 of FIG. 7.

Referring to FIGS. 3-4, a gas spring 310 includes a cylinder 312 coupled to a rod 314 (FIG. 4). The cylinder 312 has a cap end 316, a rod end 318, and a side wall 320 (e.g., cylindrical side wall) extending between the cap and rod ends 316, 318. A chamber (see, e.g., chamber 418 as shown in FIG. 7) is formed between the cylinder 312 and the rod 314—such as interior to the cylinder 312, between the cap end 316, the side wall 320, and the rod 314, which extends through the rod end 318 of the cylinder 312. Nitrogen or another gas held in the chamber compresses or expands in response to relative movement between the rod 314 and the cylinder 312 to provide the receipt, storage, or release of potential energy by the gas spring 310.

The rod 314 is configured to translate with respect to the cylinder 312. According to an exemplary embodiment, the rod 314 is coupled to or comprises a piston (see, e.g., rod 414 as shown in FIG. 7; e.g., rod end, plunger) that forms a wall of the chamber. When the rod 314 translates relative to the cylinder 312, the piston changes the volume of the chamber, compressing the gas in the chamber or allowing the gas to expand. The gas in the chamber resists compression, providing a force that is a function of the compressibility of the gas, the area of the piston, the volume and geometry of the chamber, and the current state (e.g., initial pressure) of the gas, among other factors. As such, the gas spring 310 receives potential energy, stored in the gas, as the gas is compressed and releases the potential energy as the gas expands.

The cylinder 312 of the gas spring 310 is preferably cylindrical due to structural benefits associated with cylindrical pressure vessels. However, in other contemplated embodiments, the cylinder 312 may be substituted for a body having another geometry. In some contemplated embodiments, the chamber may be formed in, or at least partially formed in the rod 314. In one such embodiment, the chamber spans both the cylinder 312 and at least a portion of the interior of the rod 314.

Figure 5:
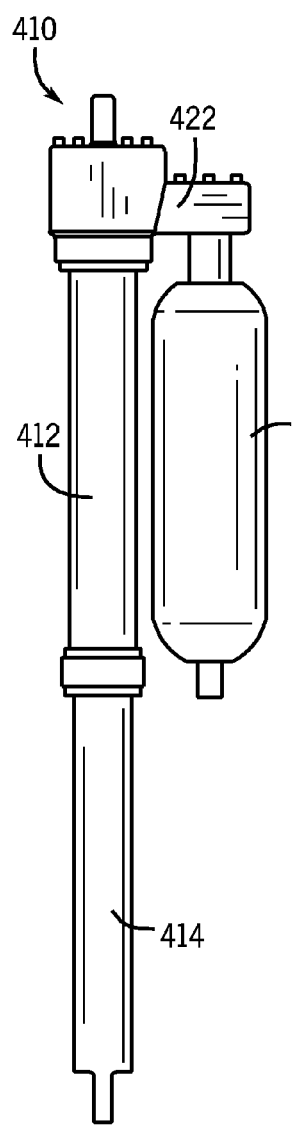
FIG. 5 is a side view of a gas spring assembly, according to an exemplary embodiment of the invention.
Figure 6:
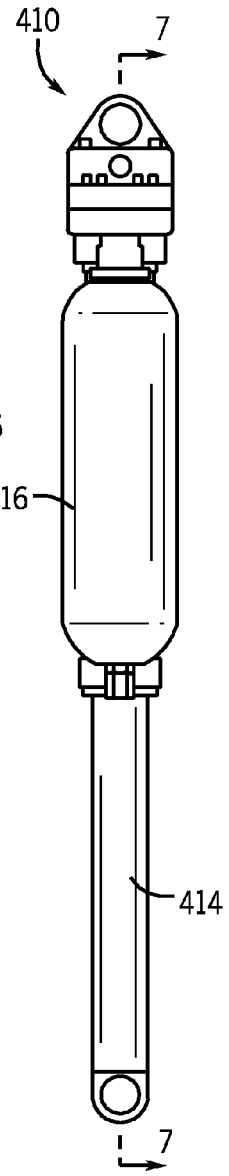
FIG. 6 is a front view of the gas spring assembly of FIG. 5.

In some embodiments, the gas spring 310 includes at least one port 322 (e.g., aperture, inlet) that may be opened to allow gas (e.g., inert gas) to be provided to or from the chamber. The chamber of the gas spring is substantially sealed when the port 322 is not open. In some embodiments, the port 322 may be coupled to an accumulator (see, e.g., accumulator 416 as shown in FIG. 5), to a pump (see, e.g., pump 230 as shown in FIG. 2), or to one or more reservoirs (not shown). In some embodiments, the spring 310 includes separate ports associated with the accumulator and the pump.

In some embodiments, the gas spring 310 further includes at least one port 324 that may be opened to allow a pressurized reservoir of a higher or a lower pressure (see generally accumulator 416 as shown in FIG. 5) to be coupled to the gas spring 310. Coupling the higher pressure reservoir to the gas spring 310 increases the pressure in the gas spring 310, causing the gas spring 310 to expand and increasing the ride height of the axle assembly. Conversely, coupling the lower pressure reservoir to the gas spring 310 decreases the pressure in the gas spring 310, causing the gas spring 310 to contract and decreasing the ride height of the axle assembly. In some embodiments, the spring 310 includes separate ports 324 for providing hydraulic fluid to the internal volume and for receiving hydraulic fluid from the internal volume.

In other contemplated embodiments, the gas spring 310 is coupled directly to a pump (see, e.g., pump 230 as shown in FIG. 2), to increase or decrease pressure in the gas spring 310 corresponding to a desired ride height. In still another contemplated embodiment, a gas spring further includes at least one port that may be opened to allow hydraulic fluid (e.g., oil) to be provided to or from an internal volume (see, e.g., internal volume 432 as shown in FIG. 8) of the gas spring. The internal volume for hydraulic fluid is separated from the chamber for gas. In such contemplated embodiments, adding or removing of hydraulic fluid from the internal volume changes the overall length of the gas spring for different ride heights of the suspension system. However using pressurized gas to change the length of the gas spring 310 may be preferable in some embodiments because of reduced losses (e.g., friction, drag) associated with a flow of gas (e.g., nitrogen) compared to hydraulic fluid (e.g., oil).

Referring now to FIGS. 5-9, a gas spring assembly 410 includes a cylinder 412 coupled to a rod 414, and an accumulator 416. A first chamber 418 (FIG. 7) is formed between the cylinder 412 and the rod 414 and a second chamber 420 is formed in the accumulator 416. According to an exemplary embodiment, the accumulator 416 includes a rigid exterior 424 (e.g., shell, housing) and a flexible, inflatable bladder 426 within the rigid exterior 424. The second chamber 420 is located between the rigid exterior 424 and the bladder 426. According to an exemplary embodiment, the accumulator 416 is positioned proximate to the cylinder 412 and rod 414, and the second chamber 420 of the accumulator 416 is connected to the first chamber 418, formed between the cylinder 412 and rod 414, by way of a gas transfer conduit 422. The gas transfer conduit 422 may include a valve 428 (e.g., check valve, poppet) for controlling access between the first and second chambers 418, 420. The valve 428 may serve to optionally disconnect the accumulator 416 from the first chamber 418, or to optionally contain gas in the second chamber 420 having a pressure exceeding or lower than gas in the first chamber 418.

In some embodiments, when the valve 428 is open, the first chamber 418 is in gaseous communication with the second chamber 420 such that a continuous body of gas extends between the two chambers 418, 420. No intermediate hydraulic fluid or mechanical element is included to transfer energy from the first chamber 418 to the second chamber 420 or vice versa. In some such embodiments, the only hydraulic fluid associated with the gas spring assembly 410 is a thin film between the rod and cylinder that moves during compression or extension of the rod 414. Use of the continuous body of gas for gaseous communication between the first and second chambers 418, 420 is intended to reduce frictional losses associated with energy transfer between the first and second chambers 418, 420, as may otherwise occur with hydraulic or mechanical intermediate elements. However, in other contemplated embodiments, hydraulic or mechanical intermediate elements may be used.

During use of the gas spring assembly 410, in some embodiments, the bladder 426 is inflated to an initial pressure. As the rod 414 and cylinder 412 are moved together, such as when the associated vehicle drives over a bump, gas in the chamber 418 compresses, providing a first spring rate for the gas spring assembly 410. In such embodiments, the pressure of the gas in the first chamber 418 is communicated to the accumulator 416 via the transfer conduit 422. If the pressure of the gas communicated from the first chamber 418 is below the initial pressure of the bladder 426, the gas spring assembly 410 will respond to the bump with the first spring rate. However, if the pressure of the gas communicated from the first chamber 418 exceeds the initial pressure in the bladder 426, then the bladder 426 will compress, increasing the effective volume of the second chamber 418, which provides a second spring rate to the gas spring assembly 410.

In some such embodiments, a pump (see, e.g., pump 230 as shown in FIG. 2) may be coupled to the bladder 426 to increase the initial pressure of the bladder 426 and thereby increase the threshold amount of loading required to achieve compression of the bladder 426, which would increase the loading required to initiate the second spring rate. Or gas may be released from the bladder 426 to decrease the threshold. As such, the value of the initial pressure of the bladder 426 may be set to achieve a desired responsiveness of the gas spring assembly 410. Use of the first and second spring rates is intended to reduce peak forces on the vehicle, improving the ride quality and durability of the vehicle. Tuning of the threshold allows for adjustment of the response of the gas spring assembly 410 depending upon a particular vehicle application.

Figure 10:
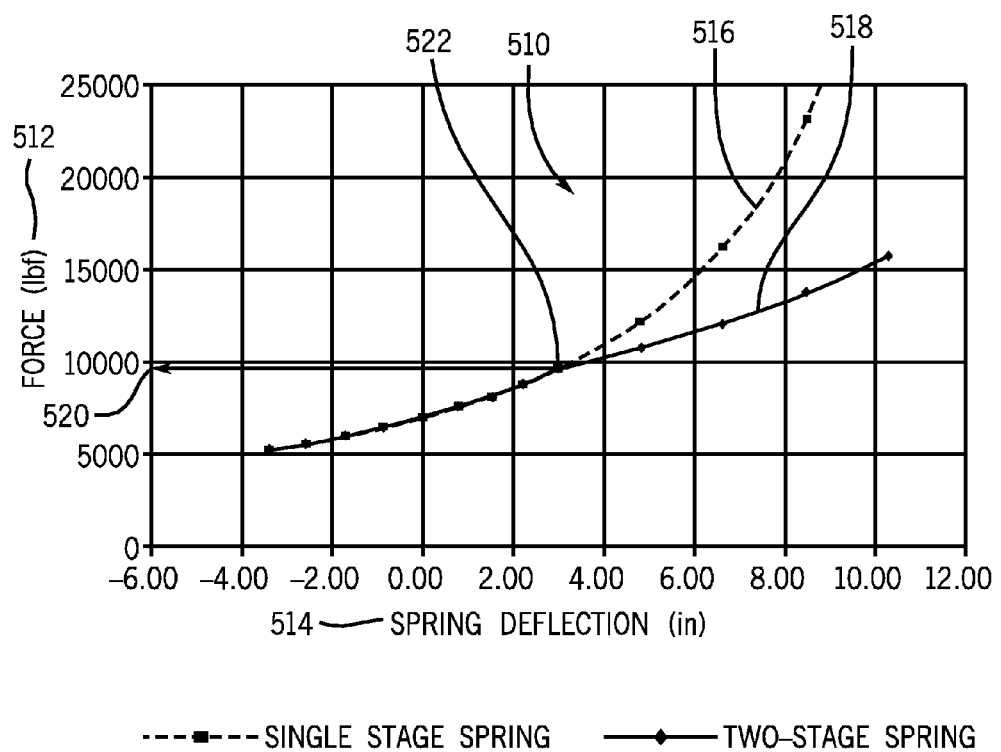
FIG. 10 is a graphical comparison of force versus displacement for a single-stage gas spring and a two-stage gas spring based upon simulation data, according to an exemplary embodiment of the invention.

FIG. 10 includes a graphical representation 510 of spring force 512 as a function of spring deflection 514 for a single-stage spring 516 (without accumulator) and two-stage spring 518 (with accumulator) based upon simulation data (i.e., prophetic representation). As deflection 514 increases, the force 512 of the spring correspondingly increases. For lesser loads, the relationship between deflection 514 and force 512 is substantially direct (e.g., quadratic, but having a substantially straight slope). However, when loading of the spring reaches a threshold 520, the spring rate (i.e., slope of the curve) of the two-stage spring 518 decreases, while the spring rate of the single-stage spring 516 continues along the same trajectory (e.g., quadratic curve). The point of inflection 522 along the two-stage spring 518 curve is adjustable by increasing or decreasing the initial pressure in the bladder.

Referring again to FIGS. 5-9, according to an exemplary embodiment, the gas spring assembly 410 includes at least one port 430 (FIG. 8) to allow hydraulic fluid to be provided to an internal volume 432 within the gas spring assembly 410. Hydraulic fluid passes through the port 430 and along a conduit 434, which distributes the hydraulic fluid into the internal volume 432 by way of a distribution element 436 (e.g., perforated plate).

In some embodiments, a floating, annular piston 438 is used to separate the hydraulic fluid in the internal volume 432 from the gas of the chamber 418. Standard or conventional hydraulic seals 440 may be used with respect to the annular piston 438 and port 430 of the internal volume 432 to prevent leakage of the hydraulic fluid. In some embodiments, standard accumulator seals are used to seal the annular piston 438. According to an exemplary embodiment, the internal volume 432 surrounds at least a portion of the first chamber 418 (for gas) within the gas spring assembly 410. As such, the hydraulic seals 440 serve to seal the gas within the gas spring 410.

According to an exemplary embodiment, the gas spring assembly further includes a sensor 442 integrated with the gas spring assembly 410 and configured to sense the relative configuration of the rod 414 and cylinder 412. In some embodiments, the sensor 442 provides a signal (e.g., digital output) that is indicative of the ride height of the associated suspension system (see, e.g., suspension system 218 as shown in FIG. 1) based upon the relative configuration of the rod 414 and cylinder 412. In contemplated embodiments, the sensor 442 includes a linear variable differential transformer (LVDT), where a shaft of the LVDT extends through the cylinder 412 to the rod 414. As the rod 414 and cylinder 412 move relative to one another, the shaft of the LVDT provides a signal (e.g., inductive current) that is a function of the movement of the shaft.

Figure 11:
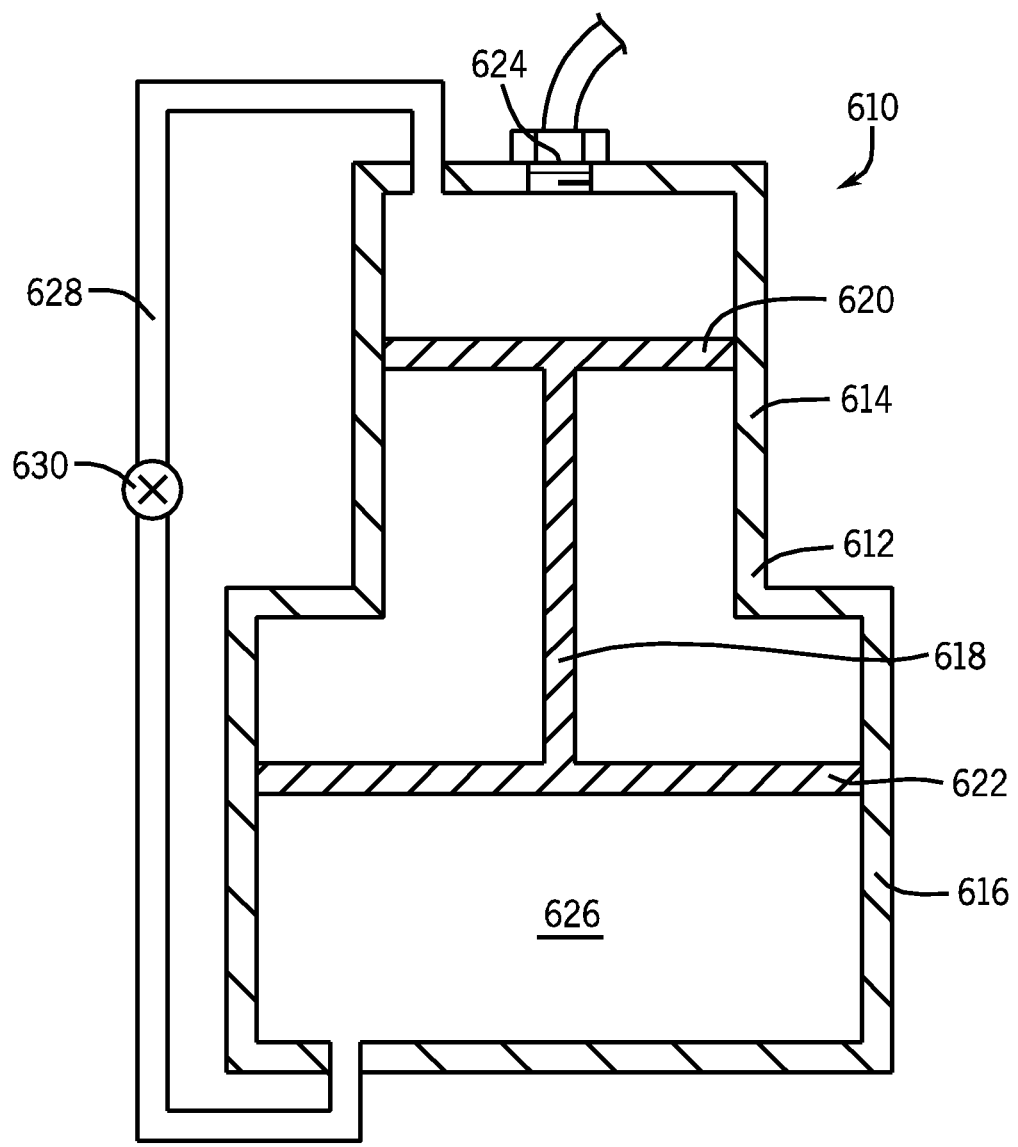
FIG. 11 is a schematic diagram of an accumulator, according to an exemplary embodiment of the invention.

Referring now to FIG. 11, an accumulator 610 includes a cylinder 612 having a first section 614 and a second section 616. In some embodiments, the first section 614 has a narrower cross section than the second section 616. The accumulator 610 further includes a piston assembly 618 having a first face 620 corresponding to the first section 614 and a second face 622 corresponding to the second section 616. An inlet 624 is coupled to the first section 614 and is configured to be in gaseous communication with gas from a chamber of a gas spring (see, e.g., chamber 418 as shown in FIG. 7). As gas is provided to the first section 614, the piston assembly 618 is moved, compressing a separate body of gas 626 in the second section 616. Compression of the second body of gas 626 receives potential energy, stored in the compressed gas.

Figure 12:
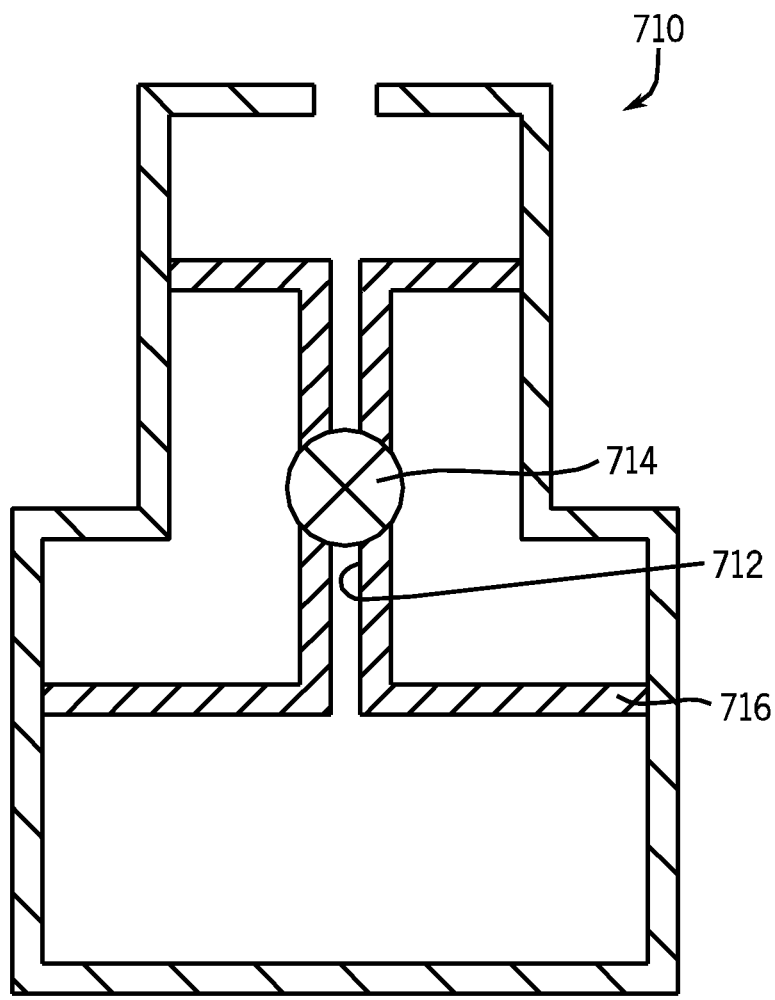
FIG. 12 is a schematic diagram of an accumulator, according to another exemplary embodiment of the invention.

In some embodiments, the accumulator 610 additionally includes a transfer tube 628 extending between the first and second sections 614, 616. The transfer tube 628 allows for controlled transfer of gas from the second section 616 to the first section 614, or vice versa. A restrictor 630 or valve may be positioned along the transfer tube 628 to control the flow of gas through the transfer tube 628. FIG. 12 shows an alternate embodiment of an accumulator 710 where a transfer tube 712 and restrictor 714 or valve is integrated with a piston assembly 716.

In some embodiments that include the transfer tube 628, 712, the two sections 614, 616 of the accumulator 610 are in gaseous communication at equilibrium (e.g., steady state). Equal pressure acts on both sides of the piston assembly 618, 716. But, due to the unequal cross-sections, a net force biases the piston assembly 618, 716 toward the first section 614. At standard operating pressures of the gas spring, the equilibrium pressure supplies a net force sufficient to overcome forces of gravity and friction acting on the piston assembly 618, 716.

During an impulse loading event, the spring compresses and rapidly communicates increased gas pressure to the first section 614 of the accumulator 610. However, due in part to the setting of the restrictor 630 and drag in the transfer tube 628, 712, the pressure in the second section 616 of the accumulator 610 does not increase as rapidly. As such, with a sufficient pressure differential between the first and second sections 614, 616, the piston assembly 618, 716 moves from the initial position. The volume of the first section 614 increases and the volume of the second section 616 decreases, compressing the gas in the second section 616, which results in a different spring rate (see, e.g., point of inflection 522 as shown in FIG. 10) for the overall gas spring assembly.

According to an exemplary embodiment, the second spring rate and threshold at which the bias of the piston assembly 618, 716 is overcome is tunable by changing the area ratio of the piston assembly 618, 716 (i.e. chamber cross-sections). In some contemplated embodiments, the setting of the restrictor 630 controls damping to the accumulator 610 and overall gas spring assembly, which may be used with or without a separate damper (see, e.g., damper 222 as shown in FIG. 1).

In other contemplated embodiments, the separate body of gas 626 in the second section 616 may be set to an initial pressure, such as by a pump (see, e.g., pump 230 as shown in FIG. 2), to bias the piston assembly 618 to an initial position. The pressure of the second body of gas 626 holds the piston assembly 618 in the initial position until the force of gas supplied to the first section 614 via the inlet 624 exceeds the force provided by the initial pressure of the separate body of gas 626 in the second section 616.

The construction and arrangements of the gas spring assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A gas spring for a vehicle suspension system, comprising:
a cylinder;
a rod disposed within the cylinder, wherein a relative movement between the rod and the cylinder changes the volume of a chamber formed between the rod and the cylinder; and
an accumulator in communication with the chamber, wherein compression of gas in the chamber at least partially provides a first spring rate for deflections of the gas spring below a threshold, wherein compression of gas in the chamber at least partially provides a second spring rate for deflections of the gas spring above the threshold, and wherein the first spring rate is greater than the second spring rate.

2. The gas spring of claim 1, wherein the accumulator comprises a rigid exterior that defines an accumulator volume and a movable component internal to the rigid exterior.

3. The gas spring of claim 2, wherein the movable component separates the accumulator volume into a first portion and a second portion, wherein the first portion is in gaseous communication with the chamber and the threshold is a function of pressure within the second portion.

4. The gas spring of claim 3, wherein the threshold is tunable by controlling the accumulator.

5. The gas spring of claim 4, the accumulator further comprising a port in the rigid exterior configured to facilitate changing the pressure within the second portion.

6. The gas spring of claim 3, wherein the movable component is a diaphragm.

7. A gas spring for a vehicle suspension system, comprising:
a cylinder;
a rod disposed within the cylinder, wherein a relative movement between the rod and the cylinder changes the volume of a chamber formed by the rod and the cylinder;
an accumulator in communication with the chamber; and
a sensor coupled to at least one of the rod and the cylinder, wherein the sensor is configured to provide a signal indicative of a ride height of the vehicle suspension system based upon the relative position of the rod and the cylinder.

8. The gas spring of claim 7, wherein the sensor comprises a linear variable differential transformer.

9. The gas spring of claim 8, wherein the sensor includes a shaft, and wherein the rod includes an end defining an aperture that receives the shaft of the sensor.

10. The gas spring of claim 9, further comprising a tubular element having an inner space that receives the shaft of the sensor, the signal provided by the sensor relating to an insertion length of the shaft into the tubular element.

11. A gas spring for a vehicle suspension system, comprising:
a cylinder;
a rod disposed within the cylinder, wherein a relative movement between the rod and the cylinder changes the volume of a chamber formed by the rod and the cylinder; and
a sensor disposed within at least one of the cylinder and the rod, wherein the sensor is configured to provide a signal indicative of a ride height of the vehicle suspension system based upon the relative position of the rod and the cylinder.

12. The gas spring of claim 11, wherein the sensor comprises a linear variable differential transformer.

13. The gas spring of claim 12, wherein the sensor includes a shaft, and wherein the rod includes an end defining an aperture that receives the shaft of the sensor.

14. The gas spring of claim 13, further comprising a tubular element having an inner space that receives the shaft of the sensor, the signal provided by the sensor relating to an insertion length of the shaft into the tubular element.

15. The gas spring of claim 14, wherein the rod includes a sidewall that defines an internal volume, wherein the tubular element is disposed within the internal volume, and wherein the shaft of the sensor extends through the chamber formed by the rod and the cylinder.

16. The gas spring of claim 15, further comprising an annular piston defining an aperture that receives the tubular element, wherein the annular piston is positioned to separate the internal volume from the chamber.

17. The gas spring of claim 16, wherein the inner space of the tubular element defines a portion of the chamber such that the internal volume defined by the rod at least partially surrounds the chamber.

18. The gas spring of claim 16, wherein the rod includes a cannular element disposed within the internal volume and at least partially surrounding the tubular element, wherein the annular piston extends between an outer surface of the tubular element and an inner surface of the cannular element.

19. The gas spring of claim 16, wherein the internal volume of the rod is configured to contain a hydraulic fluid, wherein the chamber defined by the cylinder and the rod is configured to contain a gas, and wherein the annular piston is positioned to separate the hydraulic fluid from the gas.

20. The gas spring of claim 16, wherein the sidewall of the rod defines a port in fluid communication with the internal volume such that a flow of a hydraulic fluid through the port changes an overall length of the gas spring and the ride height of the vehicle suspension system.

* * * * *